(12) United States Patent
Bouarroudj et al.

(10) Patent No.: US 10,840,765 B2
(45) Date of Patent: Nov. 17, 2020

(54) ASSEMBLY COMPRISING ROTARY ELECTRICAL MACHINE POSITIONED INSIDE ENCLOSURE

(71) Applicant: VALEO EQUIPEMENTS ELECTRIQUES MOTEUR, Creteil (FR)

(72) Inventors: Lilya Bouarroudj, Charenton le Pont (FR); Jean-Claude Labrosse, Charenton le Pont (FR); Règis Seidenbinder, Choisy le Roi (FR)

(73) Assignee: Valeo Equipements Electriques Moteur, Creteil (FR)

( * ) Notice: Subject to any disclaimer, the term of this patent is extended or adjusted under 35 U.S.C. 154(b) by 413 days.

(21) Appl. No.: 15/560,110

(22) PCT Filed: Mar. 29, 2016

(86) PCT No.: PCT/FR2016/050701
§ 371 (c)(1),
(2) Date: Sep. 20, 2017

(87) PCT Pub. No.: WO2016/156730
PCT Pub. Date: Oct. 6, 2016

(65) Prior Publication Data
US 2018/0102686 A1    Apr. 12, 2018

(30) Foreign Application Priority Data
Apr. 2, 2015    (FR) ...................................... 15 52844

(51) Int. Cl.
*H02K 5/22*    (2006.01)
*H02K 5/10*    (2006.01)
(Continued)

(52) U.S. Cl.
CPC ............... *H02K 5/225* (2013.01); *H02K 5/10* (2013.01); *H02K 9/19* (2013.01); *H02K 5/12* (2013.01); *H02K 7/006* (2013.01)

(58) Field of Classification Search
CPC .......... H02K 5/12; H02K 5/225; H02K 7/006; H02K 9/19
(Continued)

(56) References Cited

U.S. PATENT DOCUMENTS 3,170,407 A     2/1965  Johnson
4,626,721 A  * 12/1986  Ouchi ................... F04D 29/126
                                                     174/151
(Continued)

*Primary Examiner* — Thienvu V Tran
*Assistant Examiner* — Bart Iliya
(74) *Attorney, Agent, or Firm* — Berenato & White, LLC

(57) ABSTRACT

The invention primarily relates to an assembly, in particular for a hybrid vehicle, wherein the assembly comprises; an enclosure (46) for receiving a coolant liquid and having an opening (49) for bringing the inside of the enclosure (46) into communication with the outside of the enclosure (46), a rotary electric machine (10) arranged in the enclosure (46) able to be cooled by the coolant liquid, an electrical connector element (51) arranged to be electrically connected to the rotary electric machine (10), the connector element (51) being sealingly mounted in the opening (49) of the enclosure (46) in such a way that the connector element (51) participates in the sealing that prevents the liquid from flowing from the inside of the enclosure (46) to the outside of the enclosure (46) via the opening (49).

23 Claims, 3 Drawing Sheets

(51) Int. Cl.
 *H02K 9/19* (2006.01)
 *H02K 5/12* (2006.01)
 *H02K 7/00* (2006.01)

(58) Field of Classification Search
 USPC .............................................. 310/71, 87–89
 See application file for complete search history.

(56) References Cited

U.S. PATENT DOCUMENTS

| | | |
|---|---|---|
| 4,800,732 A | 1/1989 | Newton |
| 5,514,922 A | 5/1996 | Yabushita et al. |
| 2006/0279162 A1 | 12/2006 | Achor et al. |
| 2008/0311763 A1* | 12/2008 | Dubuc ................... H02K 5/225 439/18 |
| 2013/0088106 A1 | 4/2013 | Bitzer et al. |
| 2015/0115755 A1* | 4/2015 | Yamasaki ................ H02K 5/10 310/71 |
| 2019/0280571 A1* | 9/2019 | Wilkinson ......... H02K 11/0094 |

\* cited by examiner

ASSEMBLY COMPRISING ROTARY ELECTRICAL MACHINE POSITIONED INSIDE ENCLOSURE

CROSS-REFERENCE TO RELATED APPLICATIONS AND CLAIM TO PRIORITY

This application is a national stage application of International Application No. PCT/FR2016/050701 filed Mar. 29, 2016, which claims priority to French Patent Application No. 1552844 filed Apr. 2, 2015, the disclosures of which are incorporated herein by reference and to which priority is claimed.

FIELD OF THE INVENTION

The present invention relates to an assembly comprising a rotary electrical machine positioned inside an enclosure which is filled at least partly with a liquid. The invention has a particularly advantageous, but not exclusive, application with high-power reversible electrical machines which can operate in alternator mode and in motor mode coupled to a gearbox.

BACKGROUND OF THE INVENTION

In a known manner, rotary electrical machines comprise a stator and a rotor integral with a shaft. The rotor can be integral with a driving and/or driven shaft, and can belong to a rotary electrical machine in the form of an alternator, an electric motor, or a reversible machine which can operate in both modes.

The stator is fitted in a housing which is configured to rotate the shaft, for example by means of bearings. The rotor comprises a body which is formed by a stack of sheets of metal plates retained in the form of a set by means of a suitable securing system. The rotor comprises poles which are formed for example by permanent magnets accommodated in cavities provided in the magnetic mass of the rotor. Alternatively, in a so-call "projecting" poles architecture, the poles are formed by coils wound around arms of the rotor.

In addition, the stator comprises a body constituted by a stack of thin metal plates forming a crown, the inner face of which is provided with notches open towards the interior in order to receive phase windings. These windings pass through notches in the in the stator body, and form chignons which project on both sides of the stator body. The phase windings are obtained for example from a continuous wire covered with enamel, or from conductive elements in the form of pins which are connected to one another by welding. These windings are polyphase windings connected in the form of a star or a triangle, the outputs of which are connected to an electrical control module.

In certain types of motor vehicle traction chains which ensure transmission of the mechanical power of the thermal engine to the wheels of the vehicle, a high-power reversible rotary electrical machine is coupled to the gearbox of the vehicle. The electrical machine can then operate in an alternator mode, in order in particular to supply energy to the battery and to the on-board network of the vehicle, and in a motor mode, not only to ensure starting of the thermal engine, but also to participate in the traction of the vehicle, alone or in combination with the thermal engine.

SUMMARY OF THE INVENTION

The objective of the invention is to propose a compact assembly in which the electrical machine is situated inside an enclosure constituted by the housing of the gearbox which is filled at least partly with liquid, whereas the electrical control module is situated outside the enclosure. In particular, the objective of the invention is to propose a configuration which avoids the problems of sealing at the electrical connection between these two elements.

For this purpose, the subject of the invention is an assembly, in particular for a hybrid vehicle, characterised in that the said assembly comprises:

an enclosure which can receive a cooling liquid, and comprises an opening in order to make the inside of the said enclosure communicate with the outside of the said enclosure;

a rotary electrical machine arranged in the said enclosure, which can be cooled by the said cooling liquid;

an electrical connector element which is designed to be connected electrically to the said rotary electrical machine;

the said connector being fitted in the said opening in the said enclosure in a sealed manner, such that the said connector element participates in the sealing, thus making it possible to prevent liquid from flowing from the inside of the said enclosure to the outside of the said enclosure via the said opening.

The invention thus makes it possible to guarantee the sealing of the assembly, as a result of the positioning of the connector, which closes at least partly the opening provided in the enclosure. In addition, the connector element permits connection with the electrical control module which is positioned outside the enclosure.

According to one embodiment, the said connector element comprises at least one seal in order to prevent liquid from flowing from the inside of the said enclosure to the outside of the said enclosure via the said opening.

According to one embodiment, the said connector element comprises an inner seal, which in particular is annular, forming the said seal, the said inner seal being designed to prevent liquid from flowing from the inside of the said enclosure to the outside of the said enclosure via the said opening.

According to one embodiment, the said inner seal is supported against a support face, in particular inside the said enclosure.

According to one embodiment, the said connector element comprises a shoulder on which the said inner seal is supported, such that the said inner seal is compressed between the said support face of the said enclosure and the said shoulder.

According to one embodiment, the said shoulder is situated inside the enclosure.

According to one embodiment, the said shoulder is situated outside the rotary electrical machine.

The inner seal can be situated outside the rotary electrical machine.

According to one embodiment, the said inner seal is situated inside the said enclosure.

According to one embodiment, the said inner seal surrounds the said opening.

According to one embodiment, the said connector comprises a plurality of passage orifices for electrical terminals.

According to one embodiment, the said passage orifices receive seals to prevent liquid from flowing from the inside of the said enclosure to the outside of the said enclosure via the said opening.

According to one embodiment, the said seals are arranged around electrical terminals, in particular outside the enclosure.

According to one embodiment, the said seals are arranged on an outer wall of the connector element.

As a variant, the said seals can be arranged on an inner wall of the connector element.

According to one embodiment, the connector element comprises at least one groove surrounding the electrical terminal, the groove being designed to receive the seal arranged around the corresponding electrical terminal.

According to one embodiment, the said connector element comprises an outer seal which can prevent impurities from flowing from the outside of the said enclosure to the said connector element when the said connector element cooperates with a complementary connector element.

According to one embodiment, the said assembly comprises an electrical control module comprising a complementary connector element which is designed to be connected electrically to the said connector element.

The electrical control module can comprise an inverter.

The electrical control module can be cooled by a cooling liquid of a type different from the type of cooling liquid which circulates in the enclosure for the cooling of the rotary electrical machine.

The cooling liquid which circulates in the enclosure can comprise an oil.

The cooling liquid of the electrical control module can comprise water.

According to one embodiment, the said connector element is of the male type, and the said complementary connector element is of the female type.

According to one embodiment, the passage orifices are designed to permit the passage of electrical terminals which can convey control signals, and electrical terminals which can convey power signals.

According to one embodiment, a seal, in particular an O-ring seal, is arranged around electrical terminals which can convey power signals, the said seals being arranged in particular on a wall of the connector element, which wall is situated on the side from which the electrical terminals extend.

At least some of the passage orifices can be provided directly in the said connector element.

At least some of the passage orifices can also be provided in an added on sub-connector.

According to one embodiment, the said connector element comprises a base provided with tracks which are designed to permit the electrical contact between electrical terminals of the said connector element and phase outputs of the said rotary electrical machine.

According to one embodiment, the said base is situated around the said shoulder.

According to one embodiment, the said base is overmoulded on the said tracks, such that the said tracks are embedded in the mass, which in particular is made of plastic, of the said connector element.

According to one embodiment, the said tracks extend on a plane perpendicular to the orientation of the said electrical terminals.

According to one embodiment, the said base and the said tracks are situated inside the said enclosure.

According to one embodiment, the electrical terminals which can convey power signals have a circular cross-section.

As a variant, the power terminals which can convey power signals can have a rectangular cross-section.

According to one embodiment, the electrical terminals which can convey the control signals are surrounded by the electrical terminals which can convey the power signals.

BRIEF DESCRIPTION OF THE DRAWINGS

The invention will be better understood by reading the following description and examining the figures which accompany it. These figures are provided purely by way of illustration, and in no way limit the invention.

Elements which are identical, similar or analogous retain the same reference from one figure to another.

DETAILED DESCRIPTION OF THE
PREFERRED EMBODIMENT(S)

Figure 1:
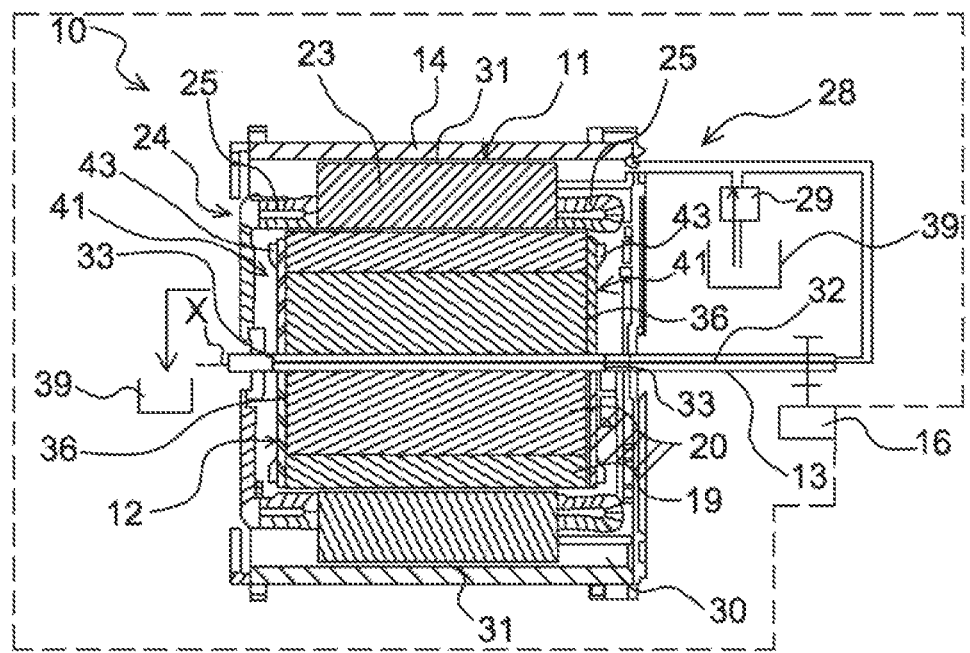
FIG. 1 is a view in longitudinal cross-section of a rotary electrical machine used in the assembly according to the present invention.

FIG. 1 shows a rotary electrical machine 10 comprising a polyphase stator 11 surrounding a rotor 12 with an axis X fitted on a shaft 13. The stator 11 is supported by a housing 14 which is configured to rotate the shaft 13 by means of bearings. The stator 11 of the machine 10 surrounds the rotor 12 with the presence of an air gap between the inner periphery of the stator 11 and the outer periphery of the rotor 12.

This electrical machine 10 is designed to be coupled to a gearbox 16 belonging to a motor vehicle traction chain. The machine 10 can then operate in an alternator mode, in order in particular to supply energy to the battery and to the on-board network of the vehicle, and in a motor mode, not only to ensure the starting of the thermal engine of the vehicle, but also to participate in the traction of the vehicle, alone or in combination with the thermal engine. The power of the machine 10 can be between 18 kW and 50 kW.

More specifically, the rotor 12 comprises a body 19 in the form of a set of metal plates. Permanent magnets 20 are implanted in openings in the body 19. The magnets 20 can be made of rare earth or ferrite, according to the applications and the power required from the machine 10. Alternatively, the poles of the rotor 12 can be formed by coils.

In addition, the stator 11 comprises a body 23 in the form of a set of plates provided with notches, for example of the half-closed type, equipped with a notch insulator for the fitting of the winding 24 of the stator 11. The winding 24 comprises a set of phase windings which pass through the notches in the body 23 of the stator 11, and form chignons 25 extending on both sides of the body 23 of the stator 11. The phase windings are in this case obtained from conductive elements in the form of pins, which are connected to one another for example by welding. These windings are for example three-phase windings which are connected in the form of a star or a triangle. The outputs of the phase windings are connected to an electrical control module 55 shown in FIGS. 2 and 5.

The electrical machine 10 is cooled by means of a cooling circuit 28, which in particular is designed to permit cooling of a cooling liquid, in this case oil, between the housing 14 and the body 23 of the stator 11, in the direction of the axis X. For this purpose, the cooling circuit 28 comprises a pump 29, which makes it possible to convey the oil into a distribution chamber 30 provided in the housing 14, thus making it possible to circulate the oil inside channels 31 which extend axially along the stator 11, and are distributed angularly regularly around the circumference of the stator 11.

The oil also circulates in an axial bore 32 provided in the shaft 13 of the rotor 12, and in ducts 33 obtained from the said bore 32, which ducts have radial orientation and open towards the two axial end faces 36 of the rotor 12.

A configuration of this type thus makes it possible to convey the cooling liquid to the two axial end faces 36 of the rotor 12. The cooling circuit 28 operates in a closed loop, such that the oil is collected by the pump 29 from a reservoir 39, and is recuperated after circulation in the machine 10 in this reservoir 39.

In addition, the rotor 12 comprises two flanges 41, which are each placed against an axial end face 36 of the rotor 12. These flanges 41 ensure axial retention of the magnets 22 inside cavities 21, and are also used to balance the rotor. Each flange 41 can advantageously be provided with at least one projection unit 43 constituted by a blade, which is designed to project the cooling liquid which reaches the corresponding end face 36, by centrifugation, to the chignons 25 of the winding 24.

Figure 2:
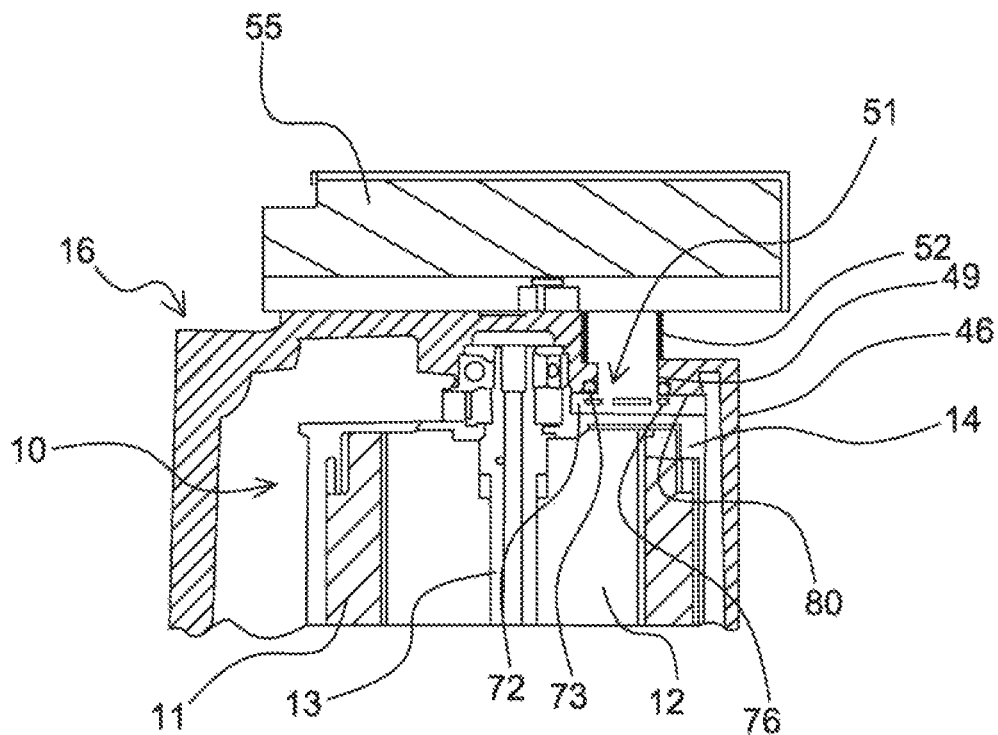
FIG. 2 is a partial view in longitudinal cross-section of an assembly according to the present invention comprising a rotary electrical machine which is positioned inside an enclosure constituted by a housing of the gearbox, and is connected electrically to its electrical control module positioned outside the enclosure.

As can be seen in FIG. 2, a housing 46 of the gearbox 16 constitutes an enclosure filled at least partly with liquid, in this case oil, which is used for the lubrication of the various mechanical components of the gearbox 16, and to carry out the cooling of the electrical machine 10, as previously described. The enclosure 46 comprises an opening 49 to make the inside of the enclosure 46 communicate with the outside of the enclosure 46.

The electrical machine 10 arranged inside the enclosure 46 comprises a toothed wheel (not represented) which is fitted on the shaft 13, and is designed to cooperate with a corresponding toothed wheel of the gearbox 16.

A connector element (or connector) 51, which is connected electrically to the electrical machine 10, is fitted in the opening 49 in the enclosure 46 in a sealed manner, such that the connector 51 participates in the sealing, thus making it possible to prevent liquid from flowing from the inside of the enclosure 46 to the outside via the opening 49.

Figure 5:
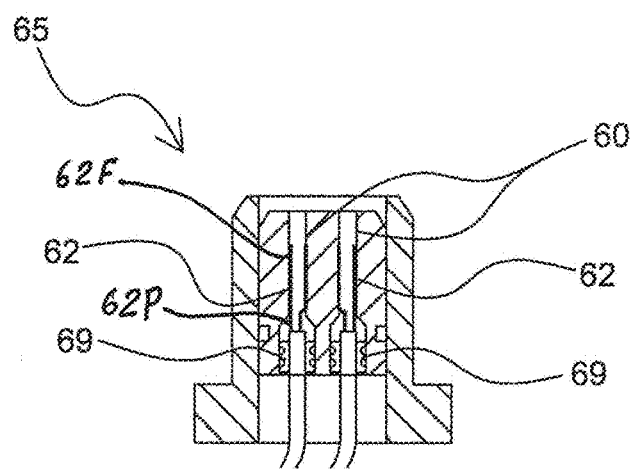
FIG. 5 is a view in cross-section of a sub-connector incorporated in the connector element of FIG. 4.

In this case, the connector 51, which is secured on an outer face of the housing 14 of the electrical machine 10, is designed to be connected electrically to a complementary connector element (or complementary connector) 52 of a female type belonging to the electrical control module 55 positioned outside the enclosure 46. Hereinafter in the description, "male or female" connector 51, 52 means the global form of the connector 51, 52, independently of the female or male type of power and control electrical terminals 61, 62 which are incorporated in this connector, and are described in further detail hereinafter. Each of the electrical terminals 61, 62 has a proximal end, such as the proximal end 62P of the electrical terminals 62, electrically connected to the rotary electrical machine 10, and a free distal end, such as the free distal end 62F of the electrical terminals 62, as best shown in FIG. 5.

Figure 4:
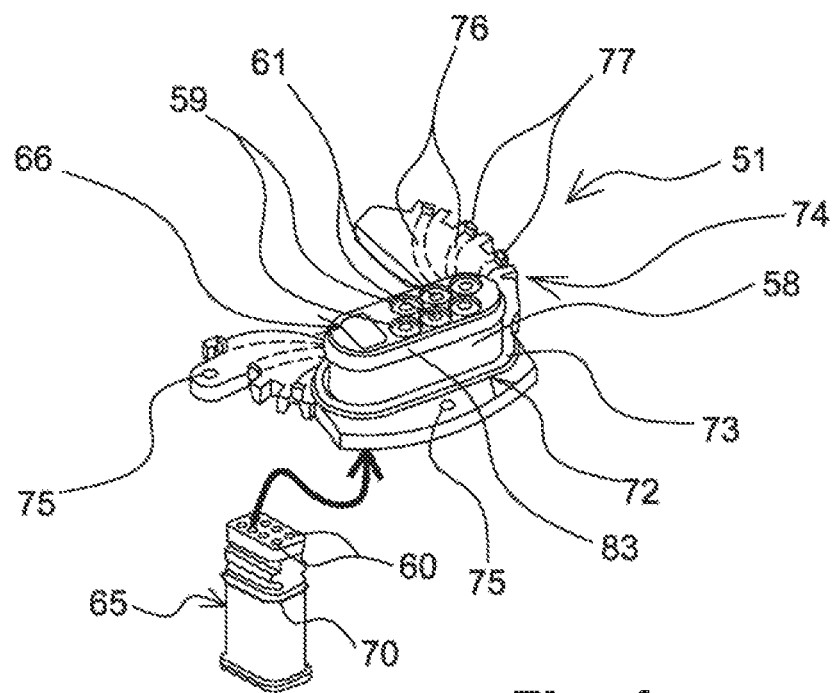
FIG. 4 is a view in perspective illustrating a second preferred embodiment of the male connector element according to the present invention which is designed to be fitted on the housing of the electrical machine.

As illustrated in FIG. 4, the connector 51 comprises a projecting part 58 which extends projecting relative to an end face of the housing 14 of the electrical machine 10 and through the opening 49, and is provided with a plurality of orifices 59, 60 receiving the electrical terminals 61, 62 therein, which can convey electrical signals.

The passage orifices 59 are provided directly in the projecting part 58. In fact, the connector 51 comprises two series of orifices 59 which are placed side-by-side, and are slightly offset relative to one another. There are six of these orifices 59 (three in each series) which permit the passage of the power electrical terminals 61 which convey the high-voltage power signals of the phase inputs and outputs of the machine 10.

The other orifices 60 are provided in a sub-connector 65, in order to permit the passage of the control electrical terminals 62 (cf. FIG. 5) which convey the low-voltage control signals, such as signals relating to the angular position of the rotor, obtained for example from a Hall-effect sensor, or temperature signals, obtained for example from a sensor which is integrated in the stator of the machine 10. The added-on sub-connector 65 is designed to be inserted inside a cavity 66 provided in the projecting part 58 of the connector 51. The sub-connector 65 can be secured to the projecting part 58 for example by snapping-in or by gluing.

In all cases, the passage orifices 59, 60 receive seals 69 which can be seen clearly in FIG. 5, in order to prevent liquid from flowing from the inside of the enclosure 46 to the outside of the enclosure 46, via the opening 49. In addition, a seal 70 can also be positioned around the sub-connector 65. As a variant, the orifices 60 for the passage of the terminals 62 which convey the control signals are provided directly in the projecting part 58, like the orifices with the reference 59.

The connector element 51 also comprises a shoulder 72, on a face of which there is fitted so as to be supported an inner seal 73, which is designed to be positioned inside the enclosure 46. In this case, the seal 73 is an O-ring seal with an elongate form.

In addition, a base 74 extends around the shoulder 72. The base 74 comprises holes 75, in order to permit the passage of means for securing the connector element 51 to the outer face of the housing 14. The base 74 is provided with tracks 76, which are designed to permit the electrical contact between the terminals 61 of the connector element 51, and the phase inputs and outputs of the machine 10. For this purpose, the phase inputs and outputs can be connected electrically by welding to the ends 77 of the tracks 76 extending relative to the outer periphery of the base 74. Preferably, the base 74 is over-moulded on the tracks 76, such that the tracks 76 are embedded in the plastic mass of the connector element 51. The base 74 and the tracks 76 extend on a plane perpendicular to the orientation of the electrical terminals 61, 62. The base 74 and the tracks 76 are designed to be situated inside the enclosure 46.

Figure 3:
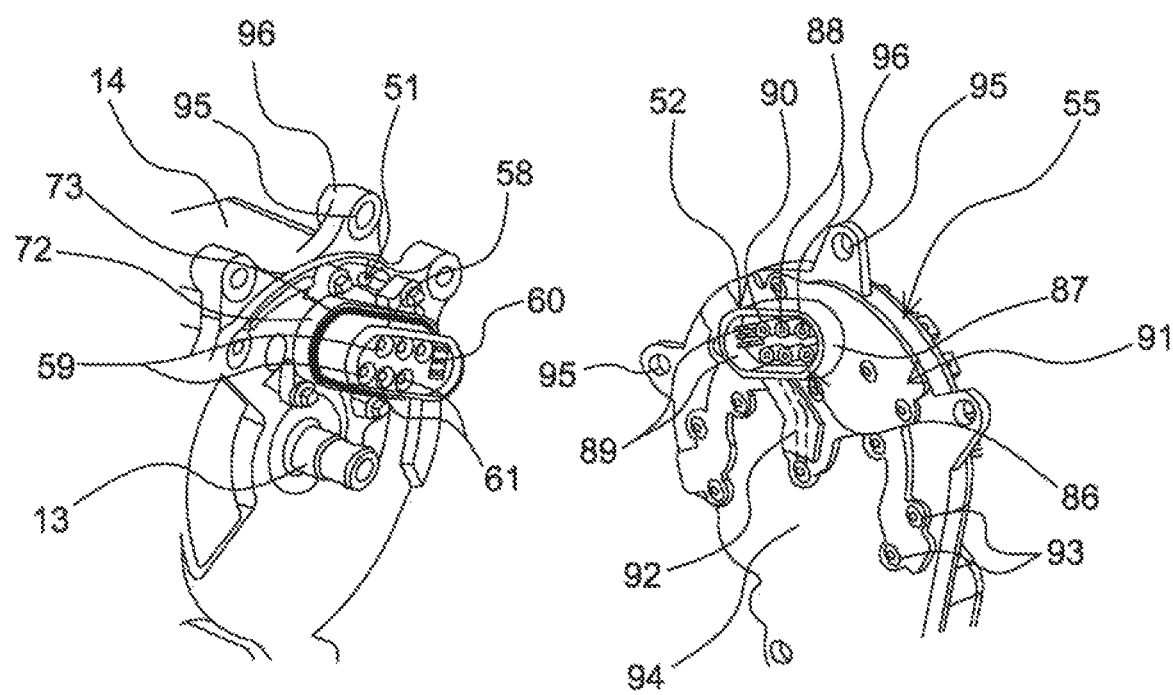
FIG. 3 is a view in perspective illustrating a male connector element fitted on the electrical machine, and a corresponding female connector element fitted on the electrical control module.

Since the phase inputs and outputs are spaced from one another around the circumference of the stator, a configuration of this type makes it possible, by means of the path of the tracks 76, to group the offset phase inputs and outputs locally in the connector element 51, in order to make the electrical signals pass via the reduced opening 49. As a variant, in the embodiment in FIG. 3, the connector element 51 is without a base 74. The winding of the stator 11 is then carried out such that the phase inputs and outputs are situated behind the connector element 51, in order to be able to provide the connections with the terminals 61 directly.

When the electrical machine 10 is positioned inside the enclosure 46, the inner seal 73 is supported against an inner support face 80 of the enclosure 46, such as to be compressed between the inner face 80 of the enclosure 46 and the shoulder 72. The seal 73 thus prevents the liquid from flowing from the inside of the enclosure 46 to the outside via the opening 49.

In this case, the inner seal 73 as well as the shoulder 72 are situated inside the enclosure 46. As a variant, the seal 73 and the shoulder 72 are positioned outside the enclosure 46, such that the seal 73 is then compressed between an outer face of the enclosure 46 and the shoulder 72. In both cases, the inner seal 73 surrounds the opening 49, which has an oblong form.

In addition, an outer seal 83 is positioned around the projecting part 58. This outer seal 83 can prevent impurities from flowing from the outside of the enclosure 46 to the connector element 51, when the connector element 51 cooperates with the complementary connector element 52.

In addition, the connector element 52 of the female type comprises a recessed part 86 delimited by a wall 87 which can receive the projecting part 58 of the male connector element 51.

The female connector element 52 comprises terminals 88 which are connected to switching elements of the control module 55, and are designed to cooperate with the power terminals 61 of the male connector element 51. In this case, the terminals 88 are fitted in tubular portions 90 positioned inside the recessed part 86.

The connector element 52 also comprises electrical terminals 89 which are connected to a control unit, and are designed to cooperate with the terminals 62 of the connector element 51 which conveys the control signals.

For this purpose, the connector element 52 comprises a base 91 provided with tracks 92 which are designed to permit the electrical contact between the electrical terminals 88 and the switching elements of the module 55. The tracks 92 can also permit the electrical contact between the electrical terminals 89 and the control unit. Preferably, the base 91 is over-moulded on the tracks 92.

The connector element 52 also comprises holes 93 in order to permit the passage of means for securing the connector element 52 on a face 94 of the control module 55 which faces towards the gearbox 16.

The terminals of the male or female type can be positioned equally well on the side of the male 51 or female 52 connector element, with the other connector element 51, 52 then comprising terminals with a complementary form.

In addition, it should be noted that, when the two connector elements 51, 52 cooperate with one another, the outer seal 83 is compressed between the outer periphery of the projecting part 58 of the male connector element 51, and the inner face of the wall 87 of the female connector element 52. The outer seal 83 thus makes it possible to prevent impurities from being able to be introduced inside the connector elements 51, 52. As a variant, the seal 83 is secured on the inner periphery of the wall 87.

In addition, it would be possible to invert the use of the connector elements 51, 52 by positioning the connector element 52 of the female type on the electrical machine 10 side, and the connector element 51 of the male type on the control module 55 side.

The mechanical assembly between the housing 14 of the electrical machine 10 and the electrical control module 55 can be carried out by means of tie rods (not represented), which are designed to pass inside openings 95 provided inside projecting ears 96 obtained from the housing 14 and the casing of the module 55.

It will be appreciated that the foregoing description has been provided purely by way of example, and does not limit the scope of the invention, a departure from which would not be constituted by replacing the various elements by any other equivalents.

The invention claimed is:

1. An assembly for a hybrid vehicle, comprising:
an enclosure (46) provided to receive a cooling liquid, and comprising an opening (49) in order to make an inside of the enclosure (46) communicate with an outside of the enclosure (46);
a rotary electrical machine (10) including a housing (14) arranged in the enclosure (46), the rotary electrical machine (10) configured to be cooled by the cooling liquid; and
an electrical connector (51) secured to the housing (14) and configured to be connected electrically to the rotary electrical machine (10);
the connector (51) being fitted in the opening (49) in the enclosure (46) in a sealed manner, such that the connector (51) participates in the sealing of the enclosure (46) to prevent liquid from flowing from the inside of the enclosure (46) to the outside of the enclosure (46) via the opening (49);
the connector (51) including electrical terminals (61, 62), each of the electrical terminals (61, 62) having a proximal end electrically connected to the rotary electrical machine (10) and a free distal end.

2. The assembly according to claim 1, wherein the connector (51) comprises at least one seal (69, 73) configured to prevent liquid from flowing from the inside of the enclosure (46) to the outside of the enclosure (46) via the opening (49).

3. The assembly according to claim 2, wherein said connector (51) comprises an inner seal (73) forming the at least one seal, wherein the inner seal (73) is configured to prevent liquid from flowing from the inside of the enclosure (46) to the outside of the enclosure (46) via the opening (49).

4. The assembly according to claim 2, wherein the connector (51) comprises a plurality of passage orifices (59, 60) for the electrical terminals.

5. The assembly according to claim 1, wherein the connector (51) comprises an inner seal (73), wherein the inner seal (73) is configured to prevent liquid from flowing from the inside of the enclosure (46) to the outside of the enclosure (46) via the opening (49).

6. The assembly according to claim 5, wherein the inner seal (73) is supported against an inner support face (80) inside the enclosure (46).

7. The assembly according to claim 6, wherein the connector (51) comprises a shoulder (72) supporting the inner seal (73) thereon such that the inner seal (73) is compressed between the inner support face (80) of the enclosure (46) and the shoulder (72).

8. The assembly according to claim 7, wherein the connector (51) comprises a plurality of passage orifices (59, 60) for the electrical terminals.

9. The assembly according to claim 6, wherein the connector (51) comprises a plurality of passage orifices (59, 60) for the electrical terminals.

10. The assembly according to claim 5, wherein the connector (51) comprises a plurality of passage orifices (59, 60) for the electrical terminals.

11. The assembly according to claim 1, wherein the connector (51) comprises a plurality of passage orifices (59, 60) for the electrical terminals.

12. The assembly according to claim 11, wherein the passage orifices (59, 60) receive seals (69) to prevent liquid from flowing from the inside of the enclosure (46) to the outside of the enclosure (46) via the opening (49).

13. The assembly according to claim 11, wherein the electrical terminals (61, 62) are disposed in the passage orifices (59, 60), wherein the electrical terminals (61, 62) comprise control electrical terminals (62) configured to transmit control signals, and power electrical terminals (61) configured to transmit power signals.

14. The assembly according to claim 1, wherein the connector (51) comprises an outer seal (83) configured to prevent impurities from flowing from the outside of the enclosure (46) to the connector (51) when the connector (51) cooperates with a complementary connector element (52).

15. The assembly according to claim 1, further comprising an electrical control module (55) comprising a complementary connector element (52) electrically connectable to the connector (51).

16. The assembly according to claim 15, wherein the connector (51) is of the male type, and the complementary connector element (52) is of the female type.

17. The assembly according to claim 1, wherein the connector (51) comprises a base (74) provided with tracks (76) configured to permit an electrical contact between the electrical terminals (61) of the connector (51) and phase outputs of the rotary electrical machine (10).

18. The assembly according to claim 17, wherein the base (74) is over-moulded on the tracks (76) such that the tracks (76) are embedded in a plastic mass of the connector (51).

19. The assembly according to claim 17, wherein the tracks (76) extend on a plane perpendicular to an orientation of the electrical terminals (61, 62).

20. The assembly according to claim 17, wherein the base (74) and the tracks (76) are situated inside the enclosure (46).

21. The assembly according to claim 1, wherein the connector (51) includes a projecting part (58) extending outwardly from the housing (14) and through the opening (49) in the enclosure (46).

22. The assembly according to claim 21, wherein the connector (51) comprises a plurality of passage orifices (59, 60) for the electrical terminals, and wherein the passage orifices (59, 60) are disposed in the projecting part (58).

23. The assembly according to claim 21, wherein the electrical terminals (61, 62) are disposed in the projecting part (58).

* * * * *